June 16, 1942.  W. E. TRUMPLER  2,286,940
INTERNAL COMBUSTION TURBINE
Filed Aug. 25, 1939  3 Sheets-Sheet 1
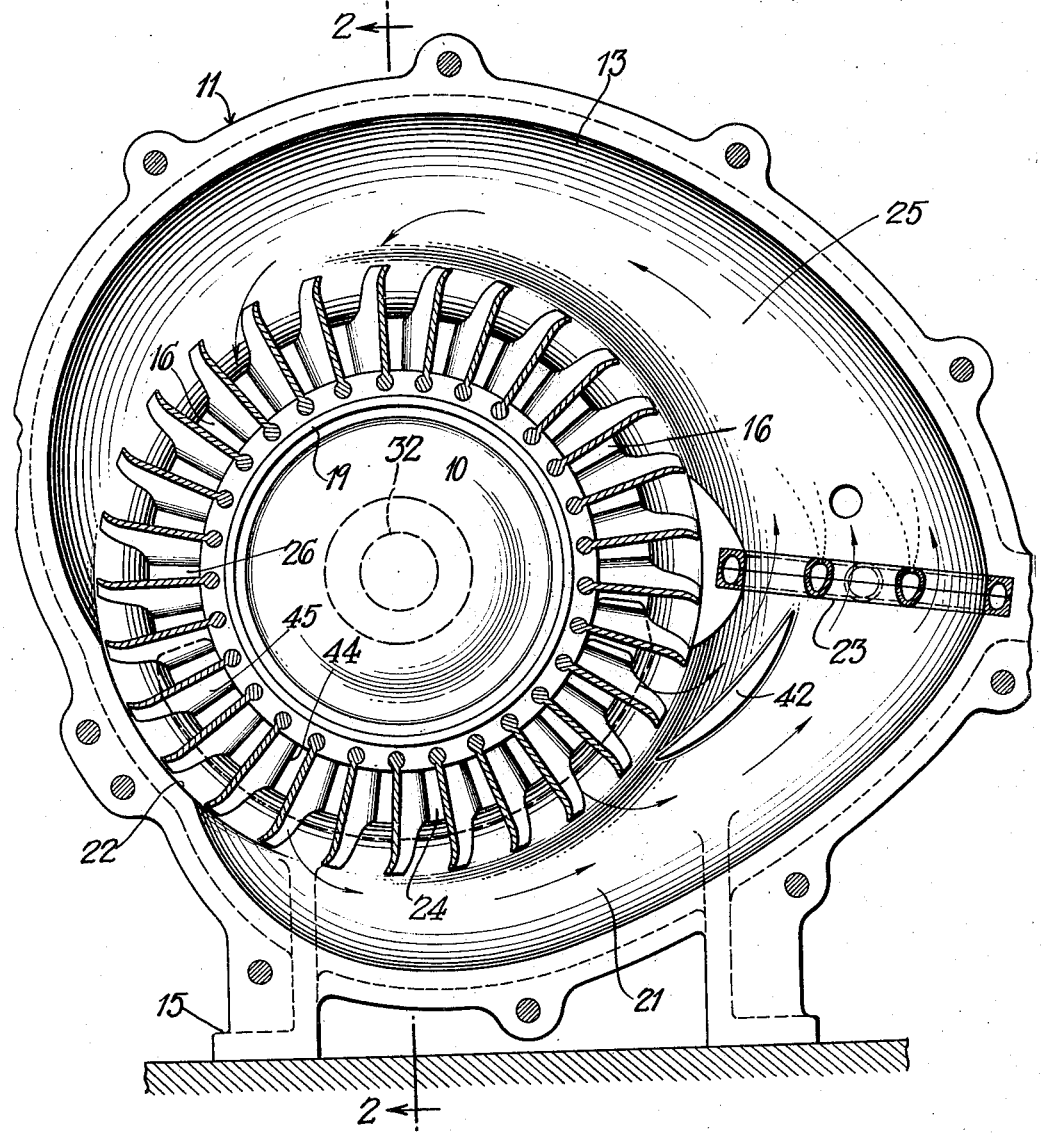
INVENTOR.
WILLIAM E. TRUMPLER.
BY Benj. T. Rauber ATTORNEY.

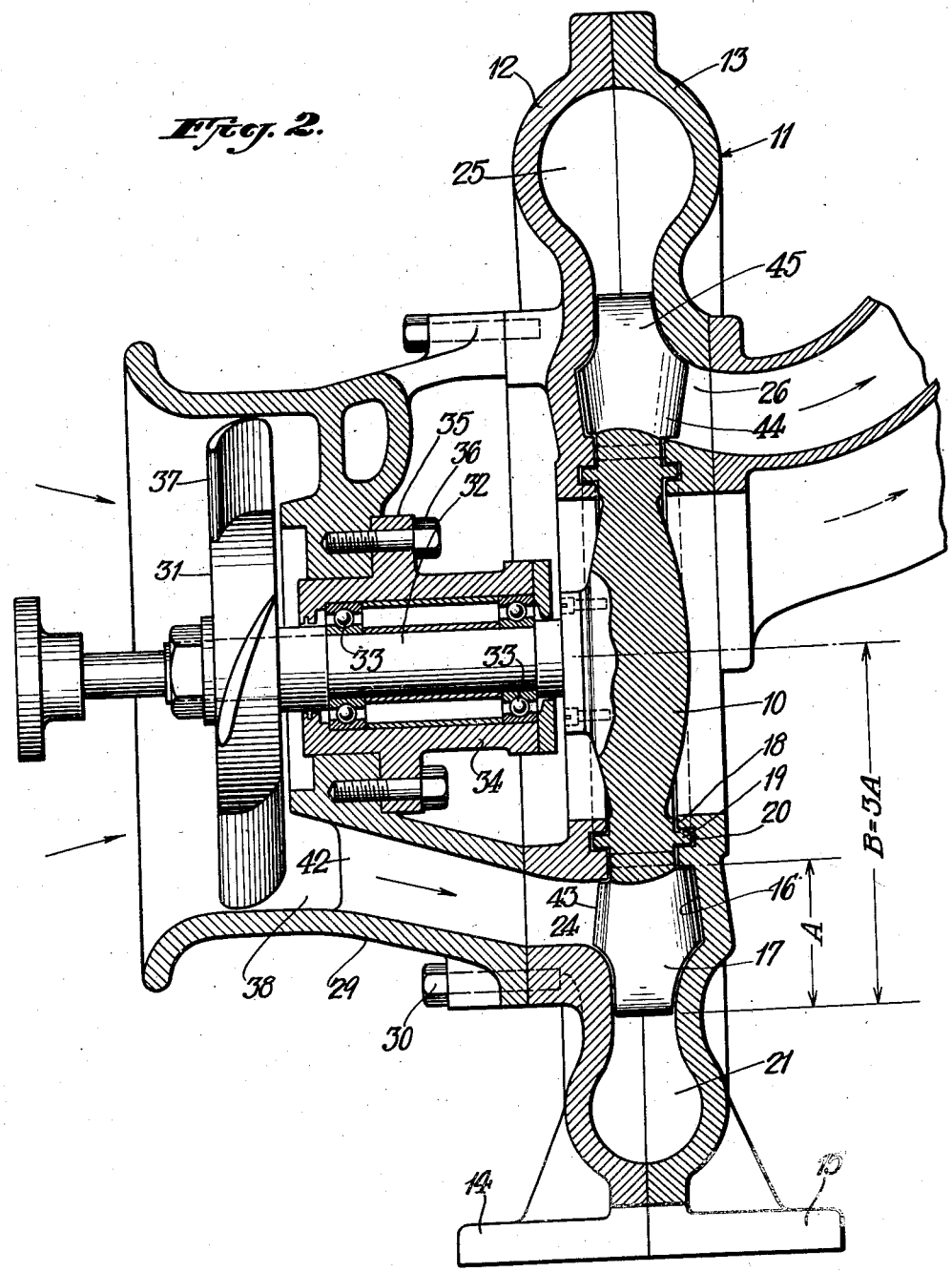

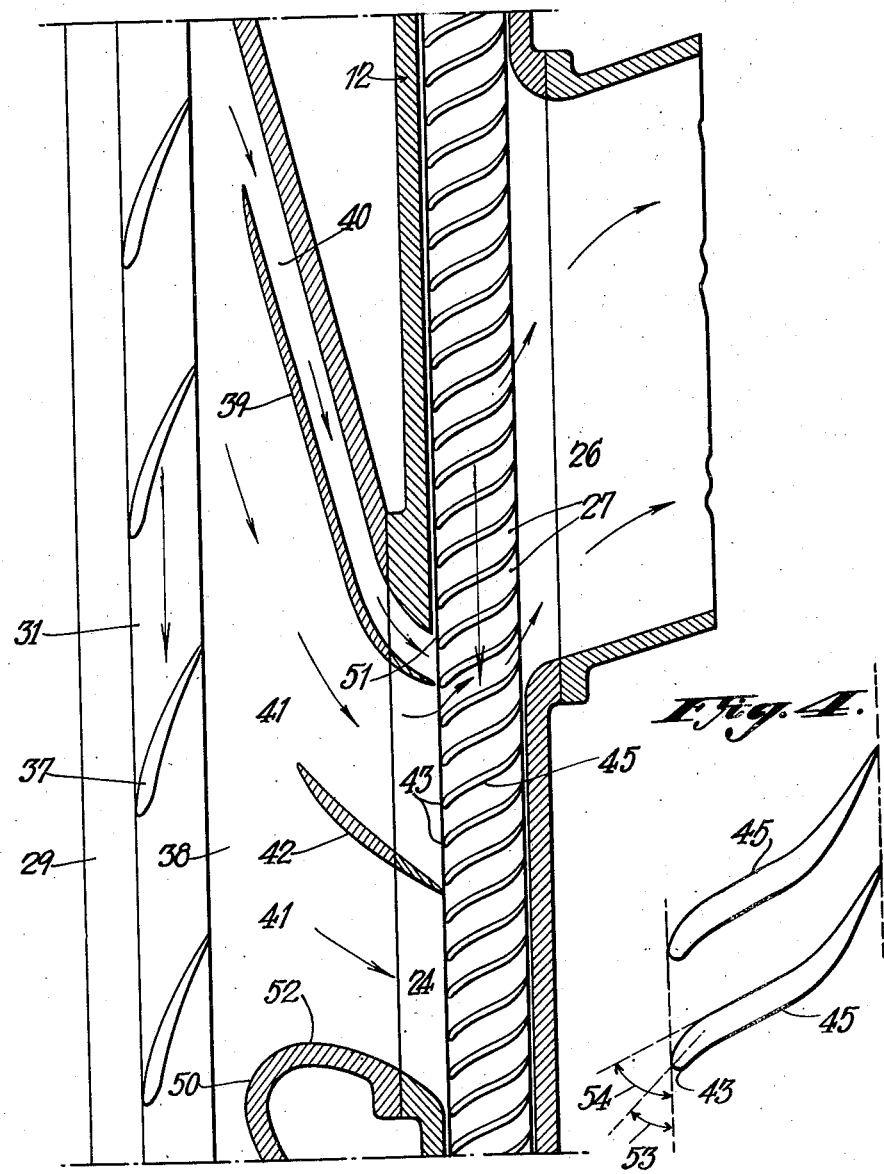

Patented June 16, 1942

2,286,940

UNITED STATES PATENT OFFICE 2,286,940

INTERNAL COMBUSTION TURBINE

William E. Trumpler, Easton, Pa.

Application August 25, 1939, Serial No. 291,822

2 Claims. (Cl. 60—41)

My invention relates to an internal combustion turbine of the type described in my Patent No. 2,138,220 granted November 29, 1938.

The general object of the invention is to provide a gas turbine which is simple in design, economical to construct and highly efficient in its operation. In achieving these objects, applicant provides a compact assembly in which a blower is operably combined with a turbine, whereby air in desired volume and at a desired pressure is effectively supplied to the blades of the rotor of the impeller. Combustion is carried on within the turbine casing and the improved design assures maximum utilization of the products of combustion for driving the rotor, the supply of air to the turbine assuring effective scavenging of the products of combustion in a small intermediate zone, the remainder of the air supplied to the turbine being utilized in a compression step, as well as for mixture with the fuel to provide desired combustion.

A feature of the invention resides in the provision of a blower and a turbine rotor mounted on a common shaft, the blower introducing air (or other gaseous medium) to be compressed. The point of introduction of the air within a primary area is under a pressure sufficiently high to overcome the back pressure plus inertia of the heated gases to cause the gases, at the end of a turbine driving step, to be scavenged or driven from the rotor, this action simultaneously effecting an induction or flow of an added volume of air into the rotor, to be compressed.

A further feature resides in the provision of a compressed air entrance area in combination with blade formations of the rotor whereby a continuity of action takes place—(a) a turbine action resulting from the utilization of the heated gases or products of combustion, (b) a scavenging action for ridding the products of combustion in a quick purging step over a relatively small area of the rotor, said ridding action leaving substantially no heated gases to reduce the efficiency of compression, and (c) a flow into the rotor, in a relatively smooth curve, of the air to be compressed and an outward flow from the rotor of such air subsequent to compression.

A further feature resides in the provision of a plurality of air entrance formations to the rotor, conformed to the blade formations of the rotor whereby maximum efficiency is achieved and smooth power curve obtained, despite the provision of a plurality of steps to be performed by the single rotor, discharging at the same rate into a common exhaust, wherein one operation substantially abruptly ends and another operation substantially precipitately begins.

Further features including the manner of supporting the rotor and fan, the utilization of a novel bearing arrangement free from the influence of the heating means within the turbine, and other advantages in construction and operation will be more apparent from the following detailed description of one form of the invention to be read in connection with the accompanying drawings in which:

Fig. 1 is a vertical section of the apparatus taken on the central plane of the rotor.

Fig. 2 is a vertical section taken at a right angle to that of Fig. 1 on the line 2—2 of Fig. 1.

Fig. 3 is a circular sectional view taken in the manner of a development on a cylindrical plane through the impeller blades of the rotor, and of the supply fan and casings or chambers intersected on the plane.

Fig. 4 is a detail view taken endwise showing the interpositioning of a plurality of rotor vanes.

In the embodiment shown in the accompanying drawings the outer peripheral edge portion of a rotor 10 is rotatably received within the inner peripheral portion of an annular compressor and turbine compartment 11 in such a manner that the rotor 10 may rotate freely within the chamber 11. The casing or chamber 11, which may be made of two halves or parts 12 and 13 having feet or bases 14 and 15, respectively, and joined on a median plane to form the casing, has an annular raceway 16 centered on the axis of the rotor 10 and shaped closely to fit impeller blades 17 projecting radially outwardly from the rotor 10 at peripherally spaced intervals, so as to permit the rotation of blades 17 around the raceway. The inward or peripheral part of the casing 11 has an annular opening 18 through which the rotor blades 17 extend. The rotor may be provided with annular flanges 19 fitting in the annular grooves 20 of the casing to form a labyrinth seal between the two. These annular flanges 19 also serve as heat interchanging surfaces between the rotor 10 and the casing 11 to prevent uneven expansion.

As the rotor 10 and blades 17 rotate, air in the channels between the blades 17 is rotated and is thrown outwardly from the blades by the centrifugal force of rotation into a diffusor or compression chamber 21. This chamber extends about somewhat less than one-half of the circumference of the rotor and expands from an area 22 closely approaching, or nearly in contact with, the tips of the blades 17, to its widest part, in which is positioned a burner 23 through which fuel is supplied and admixed with the compressed gases.

Air is supplied to the channels between the blades 17 through an inlet passage 24 extending in the casing half 12 throughout approximately the length of the compression chamber 21. Air is supplied to the passage 24 and compressed by the rotor blades 17 into the compression chamber 21 and then passes through the burner 23 where it forms a combustible mixture with the fuel injected and is burned by a continuous flame. The heated combustion gases then enter the expansion nozzle or turbine chamber 25. The combustion gases expand from the compression pressure at the burner partly through the nozzle or chamber 25 and partly through the passages to atmospheric pressure, or slightly below, as the exhaust passage 26 recovers the exit velocity and converts it into pressure. Since the heated gases have less density than the air being compressed, the difference between the compression pressure and atmospheric develops a considerable higher velocity in the nozzle and blade channels than could be developed with unheated gases, and the power developed by this velocity is greater than that required to compress the air. The heated gases, therefore, pass through the nozzle or chamber 25 and channels between the blades 17 to the exhaust port 26 in the casing half 13 and extending throughout approximately the peripheral length of the chamber 25, as indicated in Fig. 1, and overlapping the inlet opening 24 as shown in Fig. 3.

Throughout the overlapping parts of the openings 24 and 26 air may pass from the opening 24 through the channels 27 (Fig. 3) directly from the inlet opening 24 to the outlet or exhaust opening 26, as indicated by the arrows, thereby driving out a large part of the products of combustion before the channels again come into communication with the compression chamber 21.

In order to increase the compression pressure in the chamber 25 and to provide a higher velocity through channels 27 at the overlapping part, air is supplied to the inlet opening 24 under partial compression pressure by means of a fan 31 supported in a fan casing 29 attached by flanges and screws 30 to the casing half 12 of the compressor-turbine casing. Within the casing 29 there is mounted a fan 31 supported on a shaft 32 which also carries the rotor 10. The shaft 32 is rotatably supported in sleeve or anti-friction bearings 33 carried in a bearing bracket or support 34 having a flange 35 by which it is bolted to the fan casing 29 with screws 36. Through the above arrangement, therefore, the rotor 10 in rotating also drives the fan 31. The fan 31 has a number of blades 37 of the propeller type, four being shown by way of example, extending radially outward and shaped and positioned to drive and supply air into a supply passage 38 leading to the inlet opening 24 of the casing 11.

Since it is particularly important that the flow of air into the wheel channels is initiated at the point where the channels leave the nozzle chamber and move into the intake opening 24, a comparatively small channel 40 supplies intake air at a pressure above the normal pressure existing at the balance of the scavenging and intake port 41. This is accomplished by the propeller fan 31 and the unique shape of the fan casing as indicated in Fig. 3. Since the intake opening in the turbine casing extends only over a small part of the total periphery, the discharge from the fan must be diverted by a scroll type passage from the annular fan opening tangentially toward a segmental opening 24 in the casing half 12.

At the point 50 where the scroll comes closest to the fan the discharge of the fan is reduced on account of the restriction caused by the scroll. The pressure at this point therefore is equivalent to the shut-off pressure of a propeller fan, a pressure which is known to be nearly twice as high as the pressure produced under normal discharge conditions. Channel 40, separated by wall 39 from the rest of the passage 41, leads to the edge of the intake passage 24 at the overlapping side.

The pressure of the hot gases at the point 51 is relatively high due, as will be recognized by those skilled in the art, to the reaction principle inherent in the operation of turbines. Thus, there is always a back pressure in the rotor wheel itself. As the wheel speeds up, the reaction pressure builds up. The density of the hot gases, due to their high temperature, is about one-third of that of the incoming air. The air admitted through channel 40 is at higher pressure than that of the gases at point 51. This pressure is built up because of the inherent characteristics of a propeller type fan and is maximum at the point of entrance from channel 40 to the rotor and hence scavenging is effectively initiated and carried out. This is because the fan at the entrance to channel 40 is practically blanked off with the result that the pressure at this point is substantially "shut off" pressure, which in practice is several times higher than normal discharge pressure.

The air delivered by fan 31 within area 41 is also at considerable pressure and produces a flow against the reaction pressure of the rotor at the point of entrance from area 41. The flow of air through channel 40 produces the initial scavenging and induces the initial flow of air within the rotor and once this flow is established, the building up of pressure within the rotor wheel is continued efficiently. The air within area 41 approaches at relatively high velocity due to the action of the fan and the provision of channel 40 for delivery of an initial flow at maximum pressure results in quick scavenging plus instantaneous induction effect which causes a simultaneous ridding of hot gases and initiation of flow of air for compression with the "overlapping" of the two steps held to a minimum.

The propeller type fan is the type by which it is possible with simple means to create a pressure considerably above normal at a limited fraction of the normal discharge volume.

The channels 41 created by the walls 39 and 52 and the vane 42 direct the flow helically toward the rotor for reasons to be explained later.

Scavenging, no matter how carefully produced, will never be complete due to turbulence or uneven flow velocity in the blade channels. Since the flow of the scavenging air does not impart to the rotor as much work as is required to compress the additional amount of air, scavenging constitutes a loss to the turbine as a whole and, therefore, it is desirable to keep the total volume of all blade channels as low as possible. To accomplish this without restricting the useful flow in the compressor and turbine segments, the length of the blade passage must be reduced.

This length is closely proportional to the radial blade length and, therefore, the radial blade length must be kept down below a figure determined by experiment. It is necessary for good operation that the blade length be less than one-third the radius of the rotor to the blade tips, or one-sixth of the outside diameter of the rotor. Also, the shorter blades have less contact surface with the hot gases and therefore transmit less heat to the incoming air, a condition which is very desirable.

To obtain maximum efficiency of the turbine it is necessary to have not only high turbine and compressor efficiency, but also good scavenging with low power loss. In order to accomplish this purpose it is desirable to change the rate of flow through the rotor very gradually. When the blade channel leaves the turbine segment, the radial inward flow ceases and the intake port supplies air at a partial pressure. If the flow of air from the intake in the scavenging area is equal, or nearly equal, to the volume discharged under turbine operation, little or no change in the velocity of combustion products will take place at the exit edge of the blades. This condition is very desirable, as the exhaust velocity is maintained over the scavenging section and the exit velocity energy can be efficiently recovered in an exhaust diffusor.

Since air has a much higher density than the hot exhaust gases, the axial entrance to the blade channels must be larger than the exit. Otherwise the pressure required to make the cold air enter will be exceeded by the pressure required for exhausting the hot gases from the channel. The intake to the blade channel, however, is not only dependent on the scavenging operation but must also serve as an efficient intake to the compression segment. In order to satisfy both the scavenging and compressor intake conditions, it is necessary to increase the blade angle 53 (Fig. 4) to an angle not much smaller than that which the flat part of the blade makes with the center line of the rotor (angle 54). The radial height at the entrance edge is limited by the compressor operation which requires for efficiency a lower intake area in each blade channel than the exit area.

To satisfy both conditions it is necessary to give the air approaching the inlet a tangentially forward flow so that the relative velocity at the blade entrance is low and nearly axial in direction. This permits only low entrance loss and efficient compression. This arrangement does not produce as high a compression pressure, but with the propeller fan producing part of the compression at very high efficiency, this objection is fully offset.

The combination of the precompression fan, preferably of the propeller or turbine type, with a turbine rotor having a blade height not over one-third of the rotor radius to decrease the scavenging volume and an unsymmetrical blade to provide efficient entrance conditions for both compression and scavenging, makes a very efficient combustion turbine arrangement. While each individual element contributes some improvement, the best result can only be obtained by the combination of the three features.

What I claim is:

1. An internal combustion turbine of the character described including a rotor having a series of peripherally spaced radially projecting impeller blades, a casing enclosing said blades, a fan within the casing, an air inlet area for admitting air from the fan to the rotor, a channel within the area forming a passage leading from an area of high pressure at the outlet of the fan to a point at the rotor where turbine action ceases and compression action is initiated whereby air from the fan provides a flow of air into the rotor against reaction pressure and inertia existing at said point of introduction, and means for delivering from the fan other air at a lower pressure to an area adjacent said point for entrance into the rotor.

2. An internal combustion turbine of the character described comprising a casing, a rotor within the casing, a fan within the casing, an inlet to the rotor from the fan on one side of the rotor, an outlet from the rotor on the opposite side thereof, a plurality of channels for directing air from the fan toward the inlet of the rotor, one of said channels leading to a point in the rotor where turbine action ceases and compression action commences, another of said channels directing air from the fan to an area beyond the first point wherein compression takes place, means for supplying products of combustion for driving the rotor, said first channel having its inlet positioned to receive air at relatively high pressure from the fan for delivery for scavenging products of combustion and initiating a flow of air at the point where turbine action ceases against the reaction pressure and inertia existing at said point, said point being located in an area traversed by the rotor wherein the inlet to and outlet from the rotor overlap.

WILLIAM E. TRUMPLER.